United States Patent [19]

Guim

[11] Patent Number: 4,936,627
[45] Date of Patent: Jun. 26, 1990

[54] VEHICLE SEAT WITH BUILT-IN RETRACTABLE CHILD SEAT

[76] Inventor: Raul Guim, 834 Venetia, Coral Gables, Fla. 33134

[21] Appl. No.: 382,864

[22] Filed: Jul. 20, 1989

[51] Int. Cl.⁵ .............................................. B60N 1/12
[52] U.S. Cl. ..................................... 297/238; 297/250
[58] Field of Search ................. 297/238, 250, 257, 112

[56] References Cited

U.S. PATENT DOCUMENTS

| | | | |
|---|---|---|---|
| 2,337,480 | 12/1943 | Logan | 297/238 X |
| 2,436,294 | 2/1948 | Glatstein | 297/238 X |
| 2,865,427 | 12/1958 | Garfield | 297/250 |
| 3,193,326 | 7/1965 | Smith | 297/257 |
| 3,404,917 | 10/1968 | Smith | 297/250 |

*Primary Examiner*—Peter R. Brown

*Attorney, Agent, or Firm*—Malin, Haley, McHale, DiMaggio & Crosby

[57] ABSTRACT

A retractable child seat for main seat assemblies and pivotally mounted thereto. The child seat includes a seat member and a back member pivotally mounted to each other and the main seat assembly includes a pivotally mounted platform cushion where the child seat is supported by a rail assembly that allows to slidably move back and forth. Under a different embodiment, the child seat is built inside the back member of the main seat and the child seat portion is pivotally mounted thereon. Another embodiment houses the child seat inside the seat member of the main seat when not in use and a user can bring it out through supporting members pivotally mounted to structural elements inside the seat member of the main seat.

4 Claims, 3 Drawing Sheets

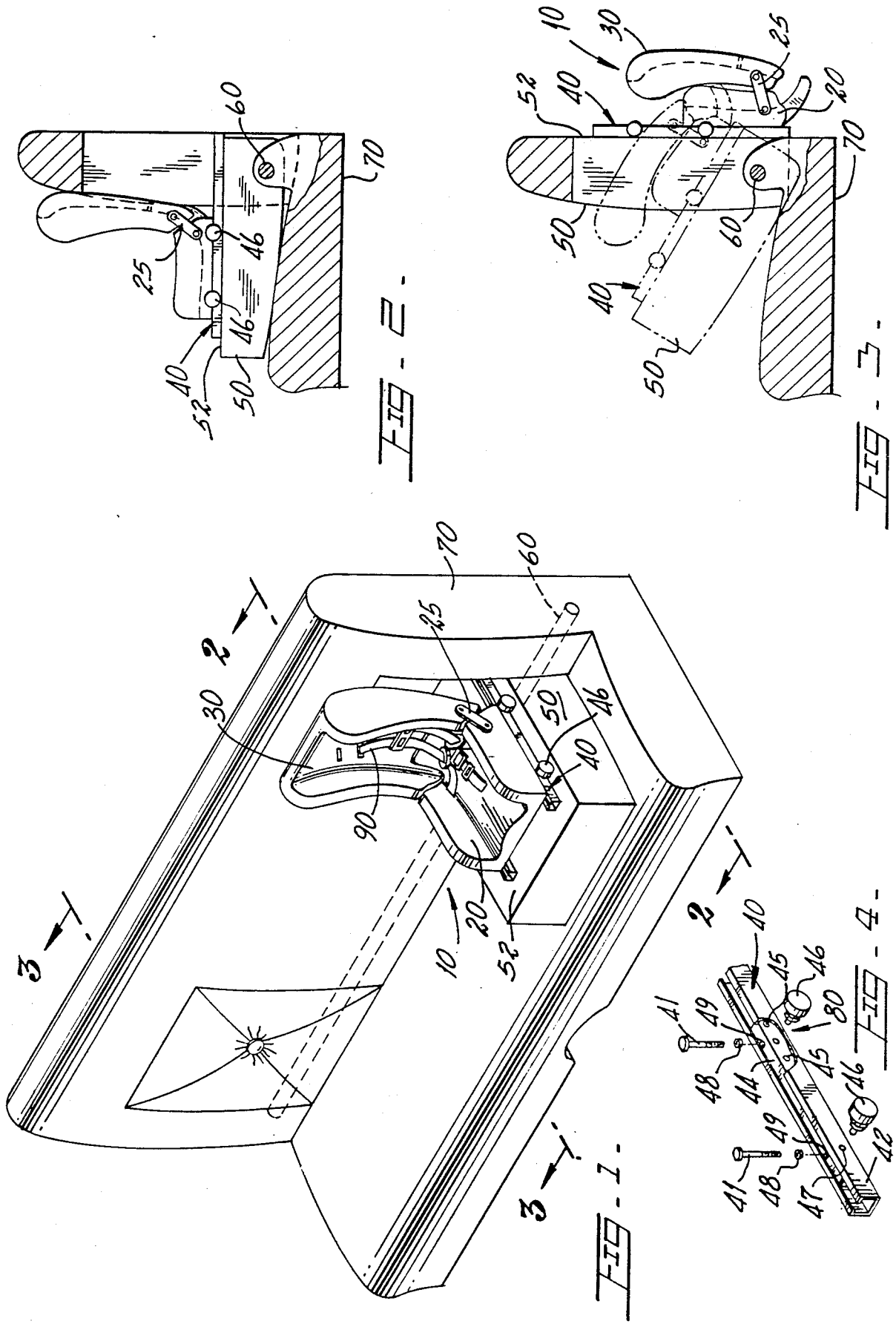

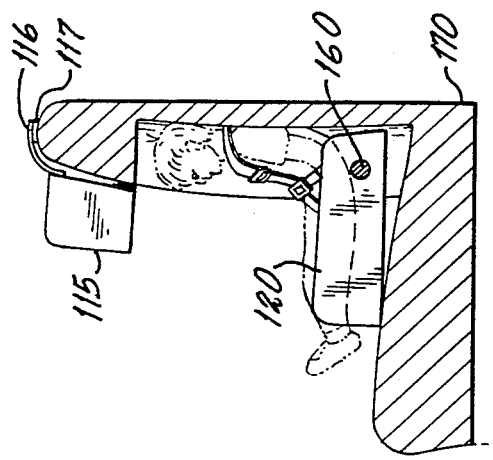
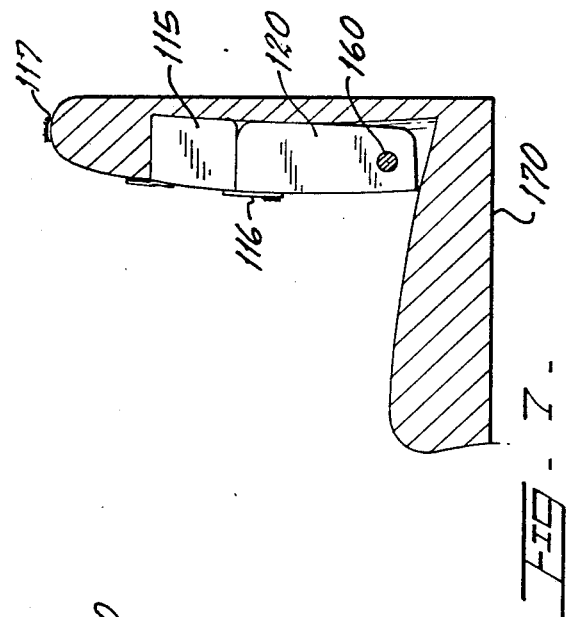
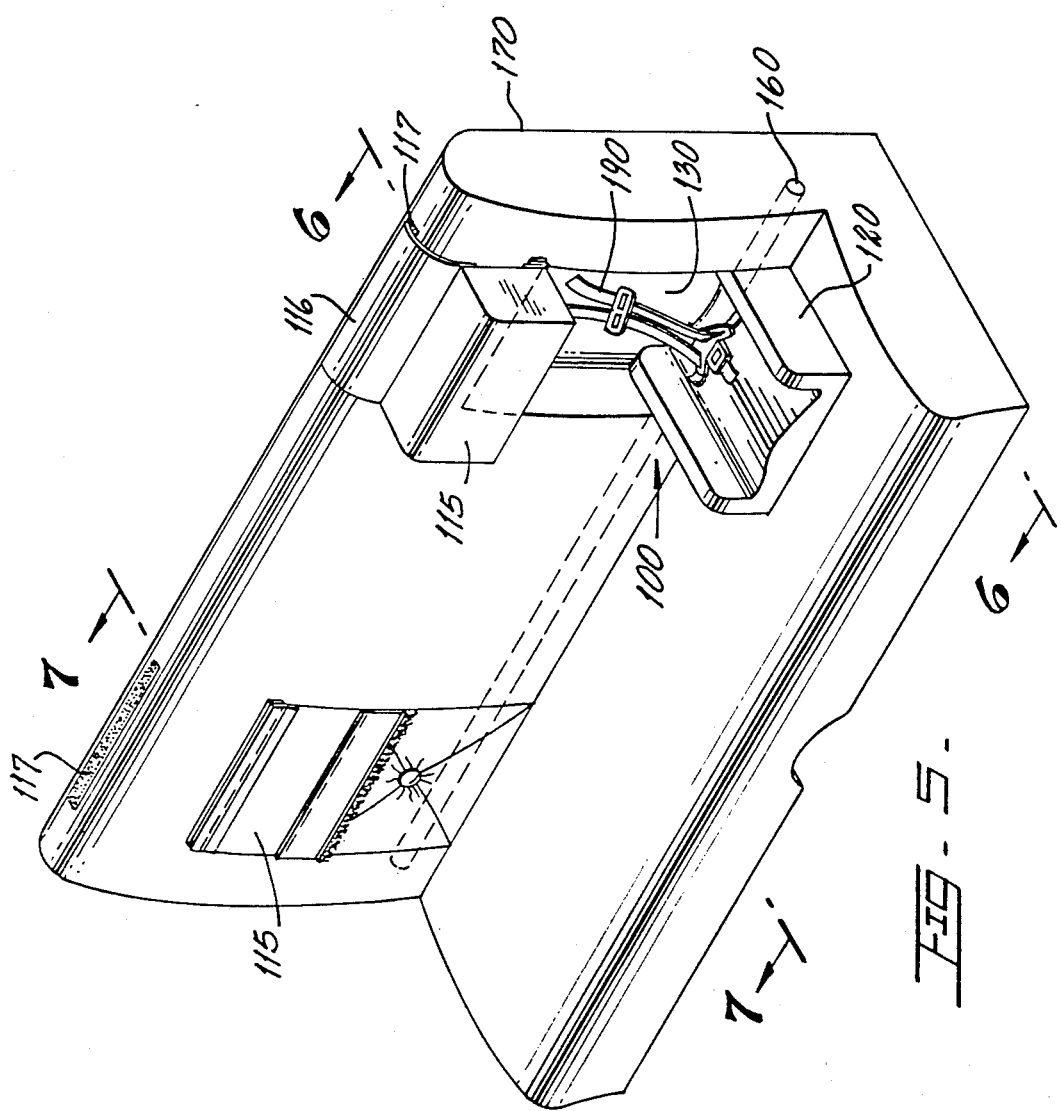

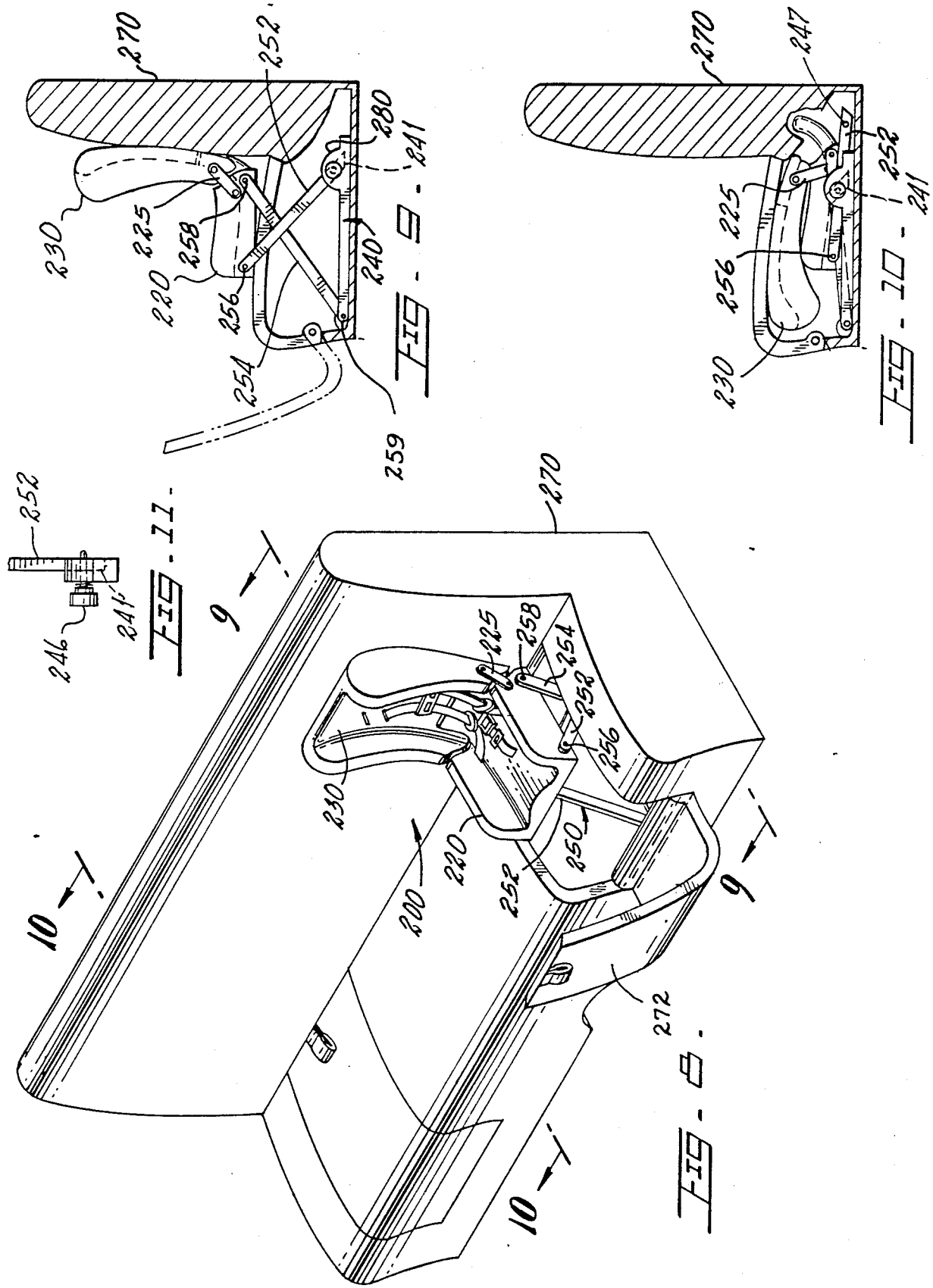

VEHICLE SEAT WITH BUILT-IN RETRACTABLE CHILD SEAT

BACKGROUND OF THE INVENTION

1. Field of the Invention

The present invention relates to child seats, and more particularly, to such seats that are retractable and built inside seats of vehicles like automobiles.

2. Description of the Related Art

Several designs for children's seats exist today and they are typically fastened to the rear seat of an automobile. None of these designs, however, is built inside the vehicle's seat. Most of these designs utilize the seat belts provided by the automobile manufacturer to secure the child seat to the automobile's main seat.

SUMMARY OF THE INVENTION

It is one of the main objects of the present invention to provide a retractable child seat that is built inside an automobile back seat and that can be readily made operational.

It is another object of the present invention to provide a child seat that is firmly mounted to the seat and that provide effective protection to the child user.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 1 represents an isometric representation of a vehicle seat incorporating a child seat in accordance with the first preferred embodiment of the present invention.

FIG. 2 shows a cross-sectional side view of the child seat and vehicle seat illustrating the former as it is used.

FIG. 3 illustrates a cross-sectional view of the retractable child seat shown in the previous two figures in the storage position and a representation of an intermediary position in phantom.

FIG. 4 is a representation of the rail assembly and locking mechanism used in the preferred embodiment.

FIG. 5 represents the second preferred embodiment of the present invention, in an isometric view.

FIG. 6 shows a cross-sectional side view of the child seat shown in the previous figure, shown in operation.

FIG. 7 shows a cross-sectional side view of the child seat represented in the previous two figures in storage position.

FIG. 8 shows a third embodiment for the present invention wherein the child seat retracts from the seat cushion of an automobile seat.

FIG. 9 represents a cross-sectional side view of the seat shown in the previous figure with a partial cross-sectional view to facilitate the viewing of the support mechanism utilized in this embodiment.

FIG. 10 illustrates a cross-sectional view of the child seat represented in the previous two figures in the storage position.

FIG. 11 is a detail view of the locking mechanism used in the third embodiment.

DETAILED DESCRIPTION OF THE PREFERRED EMBODIMENT

Referring now to FIGS. 1 through 3, where the present invention is generally referred to with numeral 10, it can be observed that it basically includes a child seat member 20 and a child back member 30 hingedly mounted thereon through plate 25. Plate 25 has two ends pivotally mounted to members 20 and 30. Member 30 is rotated forwardly towards member 20 when it is going to be stored and child seat 10 is slid back over rail assembly 40 so that it can achieve the position shown in FIG. 3. Rail mechanism 40 includes outer sleeve 42 that is, in the first preferred embodiment, rigidly mounted on internal surface 52 of rotating platform cushion 50 that in turn is pivotally mounted to axle 60. Axle 60 is rigidly mounted to a structural member of the main seat assembly 70. A locking mechanism 80 is used to adjust firmly the position of seat 10 along rail assembly 40. Inner tubular member 44 is housed within outer sleeve member 42 and the former includes several holes 45 that receive spring loaded pin 46 that protrude through openings 47 in sleeve member 42. Seat belt assembly 90 is conventionally used to secure the child to his or her seat 10. Spacers 48 are mounted over threaded holes 49 to allow screws 41 through. This way, the underside of seat member 20 is rigidly mounted to inner tubular member 44.

The second embodiment is shown in FIGS. 5; 6 and 7 and includes axle 160 that pivotally supports child seat member 120. The back member 130 of child seat 100 is defined by an inner wall of the back of main seat 170 inside a back cavity defined therein. Cushion 115, as shown in FIGS. 5 and 6, is suspended above the child's head by strap 116 that is removably mounted to the upper portion of the back of main seat seat 170 through pads of synthetic materials which adhere when pressed together, such as VELCRO pads 117, or other equivalent means, such as snap buttons or the like. The other end of strap 116 is sewn to cushion 115. Again, conventional seat belt assembly 190 is provided to secure the child to his seat 100.

The third embodiment is represented in FIGS. 8, 9 and 10 and it is stored, when it is not being used, inside the seat portion of main seat 270. It includes child's seat member 220 and back member 230 similar to the ones shown in connection with the first embodiment. Support mechanism 250 provides the support for child seat 200 and locks in place as shown in FIG. 9 and collapses to the position shown in FIG. 10. Support mechanism 250 basically includes members 252 and 254 pivotally mounted to seat member 220 at 256 and 258, respectively. Member 254 is, in this third preferred embodiment, pivotally mounted at the other end to a firm point 259 inside the seat portion of main seat assembly 270. Locking mechanism 280 provides for the adjustment of the position of member 252 along rail 240, as seen in FIG. 11. In the third embodiment the rear of rail 240 includes a protruberance where a guiding recess 241 is included to receive the end of member 252 and in cooperation with spring loaded pin member 246 is firmly held in place when the latter is inserted through opening 247.

A cover 272 is hingedly mounted to the front of seat assembly 270 and it is sufficiently cushioned to provide a confortable seating area to a user while at the same time covers child seat 200. Structural support is provided to cover 272 by child seat 200 when housed within a seat cavity and provides a supporting structure.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense.

What is claimed is:

1. A retractable child seat assembly that is completely stored behind the exterior front surface of a main back member of a main seat assembly having a main back member and a main seat member, comprising:
   A. platform cushion means, pivotally mounted at the rear end of said platform cushion to means for securing said platform cushion to said main seat assembly, said means for securing said platform cushion to said main seat assembly extending through the lower part of the body of said main back member and also being securely attached to said main seat member of said main seat assembly so that said platform cushion can be rotated back inside a slot in said main back member providing comfortable back support to a user of said main seat assembly when said child seat is not being used and said platform cushion means having an internal surface and further including rail means mounted to said internal surface;
   B. child seat means having an underside, a front end and a rear end and further including two parallel tubular means rigidly mounted to said underside and positioned from said front end to said rear end and said tubular means being slidably housed within said rail means, whereby a child may be comfortably seated while using said retractable child seat assembly;
   C. child back means pivotally mounted to said rear end whereby a child's back is supported while seated on said child seat means; and
   D. seat belt means rigidly and cooperatively mounted to said child seat for securely positioning a child within the enclosure formed by said child seat means and said child back means.

2. The child seat assembly set forth in claim 1 further including:
   E. locking means to secure said rail means in place with respect to said tubular means.

3. The child seat assembly set forth in claim 2 wherein said locking means includes spring loaded pins means disposed through the sides of said rail means, and said tubular means for holding said rail means and said tubular means in place with respect to each other.

4. The retractable child seat assembly of claim 1 wherein said means for securing said platform cushion to said main seat assembly further comprises:
   (a) an axle rigidly attached to a structural member of said main seat member; and
   (b) means to pivotally connect said platform cushion to said axle.

* * * * *